United States Patent [19]
Howell

[11] Patent Number: 5,815,164
[45] Date of Patent: Sep. 29, 1998

[54] IMAGE RESCALING IN A PARALLEL PROCESSOR

[75] Inventor: Stephen K. Howell, Santa Clara, Calif.

[73] Assignee: Sun Microsystems, Inc., Mountain View, Calif.

[21] Appl. No.: 562,878

[22] Filed: Nov. 27, 1995

[51] Int. Cl.$^6$ .............................. G06F 15/00; G06T 1/00
[52] U.S. Cl. ....................... 345/501; 345/503; 345/522; 345/524
[58] Field of Search .................................... 395/118, 128, 395/132, 139, 501, 503, 505, 522, 523, 524, 800, 376, 391, 562–565; 345/418, 428, 432, 439, 501, 503, 505, 522, 523, 524

[56] References Cited

U.S. PATENT DOCUMENTS

5,001,662  3/1991  Baun ........................................ 364/757

OTHER PUBLICATIONS

MC88110 Second Generation RISC Microprocessor User's Manual, Motorola Inc. 1991, pp. 5–1:5–25.

"i860™ Microprocessor Family," *Intel Microprocessors*, vol. II, 1991.

Bass et al., "The PA 7100LC Microprocessor: A Case Study of IC Design Decisions in a Competitive Environment," *Hewlett–Packard Journal*, Apr. 1995, vol. 46, No. 2, pp. 12–22.

Bass et al. "Design Methodologies for the PA 7100LC Microprocessor," *Hewlett–Packard Journal*, Apr. 1995, vol. 46, No. 2, pp. 23–35.

Lee et al., Real–Time Software MPEG Video Decoder on Multimedia–Enhanced PA 7100LC Processors, *Hewlett–Packard Journal*, Apr. 1995, vol. 46, No. 2, pp. 60–68.

Martin, "An Integrated Graphics Accelerator for a Low–Cost Multimedia Workstation," *Hewlett–Packard Journal*, Apr. 1995, vol. 46, No. 2, pp. 43–50.

Pearson, A Low–Cost, High Performance PA–RISC Workstation with Built–In Graphics, Multimedia, and Networking Capabilities, *Hewlett–Packard Journal*, Apr. 1995, vol. 46, No. 2, pp. 6–11.

Gwennap, Ultrasparc Adds Multimedia Instructions, *Microprocessor Report*, Dec. 1994, pp. 16–18.

Hung et al., "Statistical Inverse Discrete Cosine Transforms for Image Compression," *SPIE*, vol. 2187, Apr. 1994, pp. 196–205.

"A Central Processing Unit with Integrated Graphics Functions," U.S. Patent Application No. 08/236572, filed Apr. 29, 1994, Van Hook et al.

*Primary Examiner*—Matthew M. Kim
*Assistant Examiner*—U. Chauhan
*Attorney, Agent, or Firm*—Townsend and Townsend and Crew LLP

[57] ABSTRACT

An image rescaling method utilizing a parallel processor is provided. The computer-implemented method includes the steps of loading multiple word components into a processor in one machine instruction, each word component associated with a pixel of an image; rescaling the multiple word components in parallel; and packing the rescaled multiple word components into an image buffer in one machine instruction. Additionally, a second set of multiple word components may be processed concurrently with the processing of a first set of multiple word components.

20 Claims, 7 Drawing Sheets

IMAGE RESCALING IN A PARALLEL PROCESSOR

COPYRIGHT NOTICE

A portion of the disclosure of this patent document contains material which is subject to copyright protection. The copyright owner has no objection to the xeroxographic reproduction by anyone of the patent document or the patent disclosure in exactly the form it appears in the Patent and Trademark Office patent file or records, but otherwise reserves all copyright rights whatsoever.

BACKGROUND OF THE INVENTION

The present invention is related to image rescaling and, more particularly, to image rescaling using a parallel processor.

One of the first uses of computers was the repetitious calculations of mathematical equations. Even the earliest of computers surpassed their creators in their ability to accurately and quickly process data. It is this data processing power that makes computers very well suited for tasks such as digital image processing.

A digital image is an image where the pixels are expressed in digital values. These images may be generated from any number of sources including scanners, medical equipment, graphics programs, and the like. Additionally, a digital image may be generated from an analog image. Typically, a digital image is composed of rows and columns of pixels. In the simplest gray-scale images, each pixel is represented by a luminance (or intensity) value. For example, each pixel may be represented by a single unsigned byte with a range of 0–255, where 0 specifies the darkest pixel, 255 specifies the brightest pixel and the other values specify an intermediate luminance.

However, images may also be more complex with each pixel being an almost infinite number of chrominances (or colors) and luminances. For example, each pixel may be represented by four bands corresponding to R, G, B, and $\alpha$. As is readily apparent, the increase in the number of bands has a proportional impact on the number of operations necessary to manipulate each pixel, and therefore the image.

One such procedure that is affected is the rescaling of an image. In image rescaling, the scale of values that represent each pixel are adjusted. A simple example of image rescaling is when a user requests that an image be inverted (i.e., create a negative image). Thus, for a gray-scale image with each pixel being represented by an unsigned byte, each pixel may be rescaled by multiplying the pixel by −1 and adding 255.

Another example of image rescaling is where the image does not provide enough contrast and a higher contrast image would be desirable. Let's assume that a gray-scale image with each pixel being represented by an unsigned byte is analyzed but it is found that 95% of the pixel values are in the 0–12 range (e.g., an underexposed photo). Such an image when displayed or printed may appear to be little more than an all black image.

However, image rescaling may be utilized to increase the apparent contrast in the image. The pixels in the range of 0–12 may be proportionally spread out over the entire 0–255 range. The few pixels that, after rescaling, are above 255 may be "clipped" (or "packed") to fall within the acceptable 0–255 range. Now, when the rescaled image is displayed or printed, the user is able to see the contrast of the image. Other uses for rescaling of images are well-known.

A known equation for rescaling the pixels of an image is as follows:

$$A*pixel+B$$

where pixel is the pixel value, A is a scale value and B is an offset value. Thus, rescaling may involve one multiplication step and one addition step for each pixel. Additionally, as shown above, the result of this equation may put the pixel value outside the acceptable range for the pixel. Accordingly, a third operation may be required to "clip" the pixel to fall within the acceptable range. Typically, the clipping is performed by setting the pixel value to the minimum pixel value if it is below this minimum and setting the pixel value to the maximum pixel value if it is above this maximum. Thus, clipping may involve a couple of comparisons and an assignment operation.

Known image rescaling techniques basically loop through the image and rescale each pixel in sequence. This is a very simple process but for a moderately complex 3000×4000 pixel image, the computer may have to perform 192 million instructions or more. This estimation assumes an image of 3000×4000 pixels, each pixel being represented by four bands and four instructions to rescale each value or band. This fairly conservative calculation shows that what appears to be a simple process quickly becomes very computationally expensive and time consuming.

As the resolution and size of images increases, improved systems and methods are needed that increase the speed with which computers may rescale images. The present invention fulfills this and other needs.

SUMMARY OF THE INVENTION

The present invention provides innovative systems and methods of rescaling digital images. The present invention utilizes two levels of concurrency to increase the efficiency of image rescaling. At a first level, machine instructions that are able to process multiple data values in parallel are utilized. At another level, the machine instructions are performed within the processor concurrently. The present invention provides substantial performance increases in image rescaling technology.

In one embodiment, an image rescaling method of the present invention operates in a computer system having a processor and image buffer and includes the steps of loading multiple word components into the processor in one machine instruction, each word component associated with a pixel of an image; rescaling the multiple word components in parallel; and packing the rescaled multiple word components into the image buffer in one machine instruction. Additionally, a second set of multiple word components may be processed concurrently (or overlapping) with the processing of a first set of multiple word components.

Other features and advantages of the present invention will become apparent upon a perusal of the remaining portions of the specification and drawings.

DETAILED DESCRIPTION OF PREFERRED EMBODIMENTS

The following are definitions of some of the terms used herein.

Pixel (picture element)—a small section or spot in an image where the image is on a computer screen, paper, film, memory, or the like.

Byte—a unit of information having 8 bits.

Word—a unit of information that is typically a 16, 32 or 64-bit quantity.

Machine instructions (or code)—binary sequences that are loaded and executed by a microprocessor.

In the description that follows, the present invention will be described in reference to a Sun workstation incorporating an UltraSPARC-I microprocessor and running under the Solaris operating system. The UltraSPARC-I is a highly integrated superscalar 64-bit processor and includes the ability to perform multiple partitioned integer arithmetic operations concurrently. The UltraSPARC-I microprocessor will be described below but are also described in U.S. application Ser. No. 08/236,572 by Van Hook et al, filed Apr. 29, 1994, entitled "A Central Processing Unit with Integrated Graphics Functions," which is hereby incorporated by reference for all purposes. The present invention, however, is not limited to any particular computer architecture or operating system. Therefore, the description the embodiments that follow is for purposes of illustration and not limitation.

Figure 1:
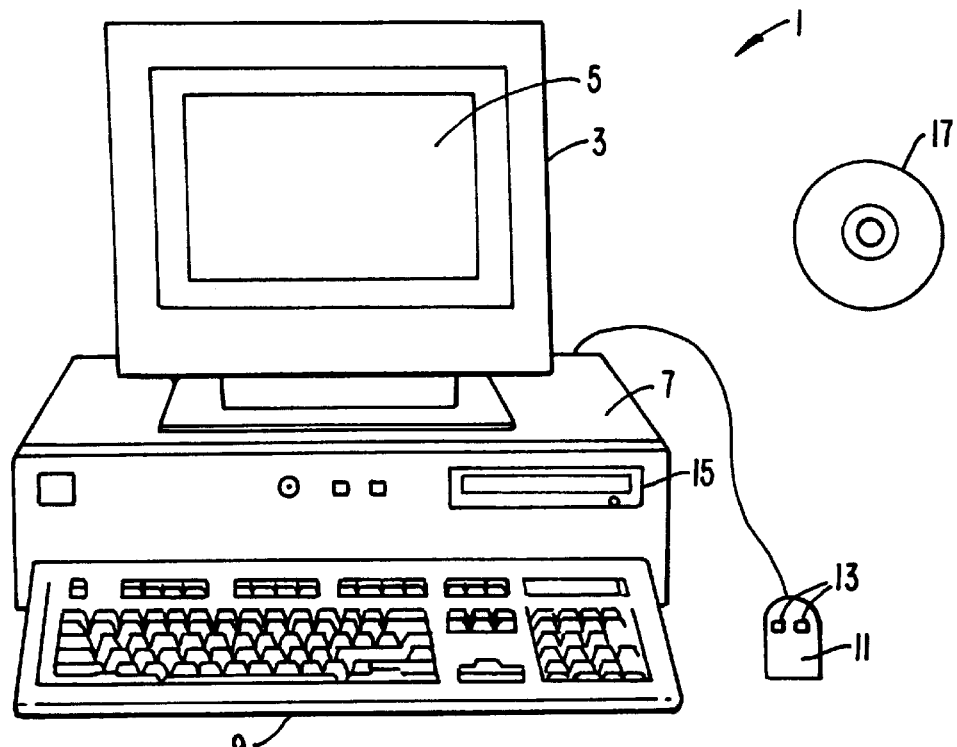
FIG. 1 illustrates an example of a computer system used to execute the software of the present invention.

FIG. 1 illustrates an example of a computer system used to execute the software of the present invention. FIG. 1 shows a computer system 1 which includes a monitor 3, screen 5, cabinet 7, keyboard 9, and mouse 11. Mouse 11 may have one or more buttons such as mouse buttons 13. Cabinet 7 houses a CDROM drive 15 or a hard drive (not shown) which may be utilized to store and retrieve software programs incorporating the present invention, digital images for use with the present invention, and the like. Although a CD-ROM 17 is shown as the removable media, other removable tangible media including floppy disks, tape, and flash memory may be utilized. Cabinet 7 also houses familiar computer components (not shown) such as a processor, memory, and the like.

Figure 2:
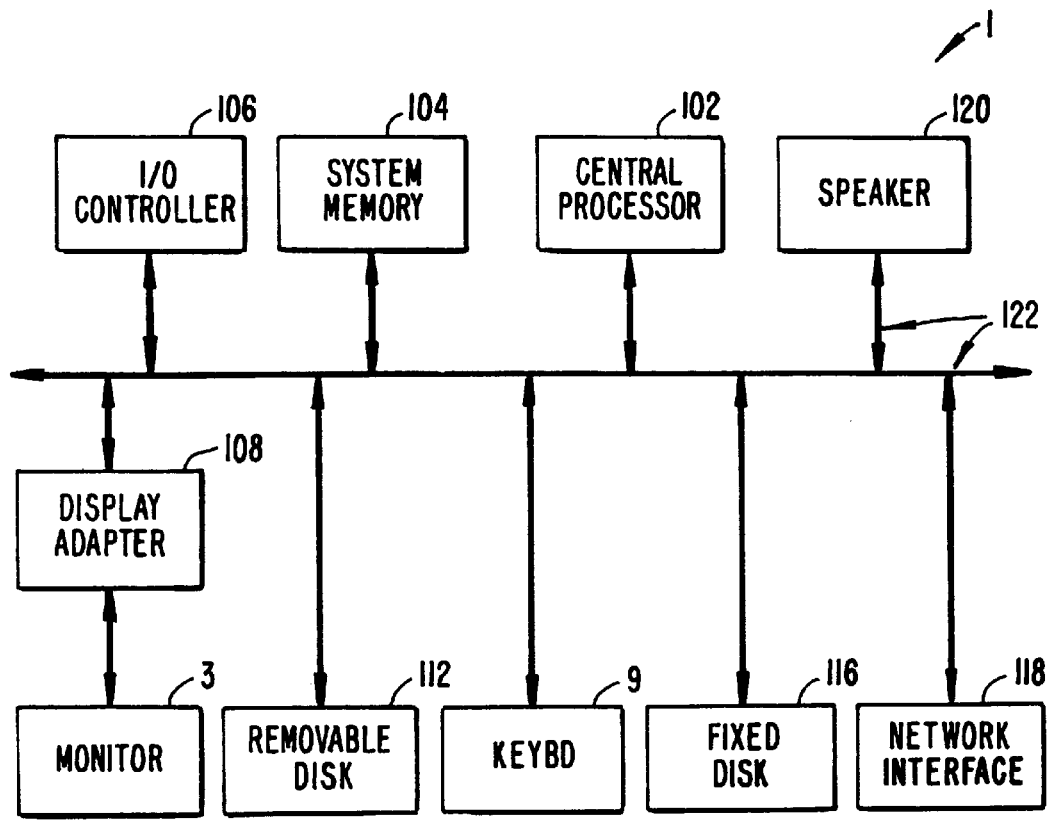
FIG. 2 shows a system block diagram of a typical computer system used to execute the software of the present invention.

FIG. 2 shows a system block diagram of computer system 1 used to execute the software of the present invention. As in FIG. 1, computer system 1 includes monitor 3 and keyboard 9. Computer system 1 further includes subsystems such as a central processor 102, system memory 104, I/O controller 106, display adapter 108, removable disk 112, fixed disk 116, network interface 118, and speaker 120. Other computer systems suitable for use with the present invention may include additional or fewer subsystems. For example, another computer system could include more than one processor 102 (i.e., a multi-processor system) or a cache memory.

Arrows such as 122 represent the system bus architecture of computer system 1. However, these arrows are illustrative of any interconnection scheme serving to link the subsystems. For example, a local bus could be utilized to connect the central processor to the system memory and display adapter. Computer system 1 shown in FIG. 2 is but an example of a computer system suitable for user with the present invention. Other configurations of subsystems suitable for use with the present invention will be readily apparent to one of ordinary skill in the art.

Figure 3:
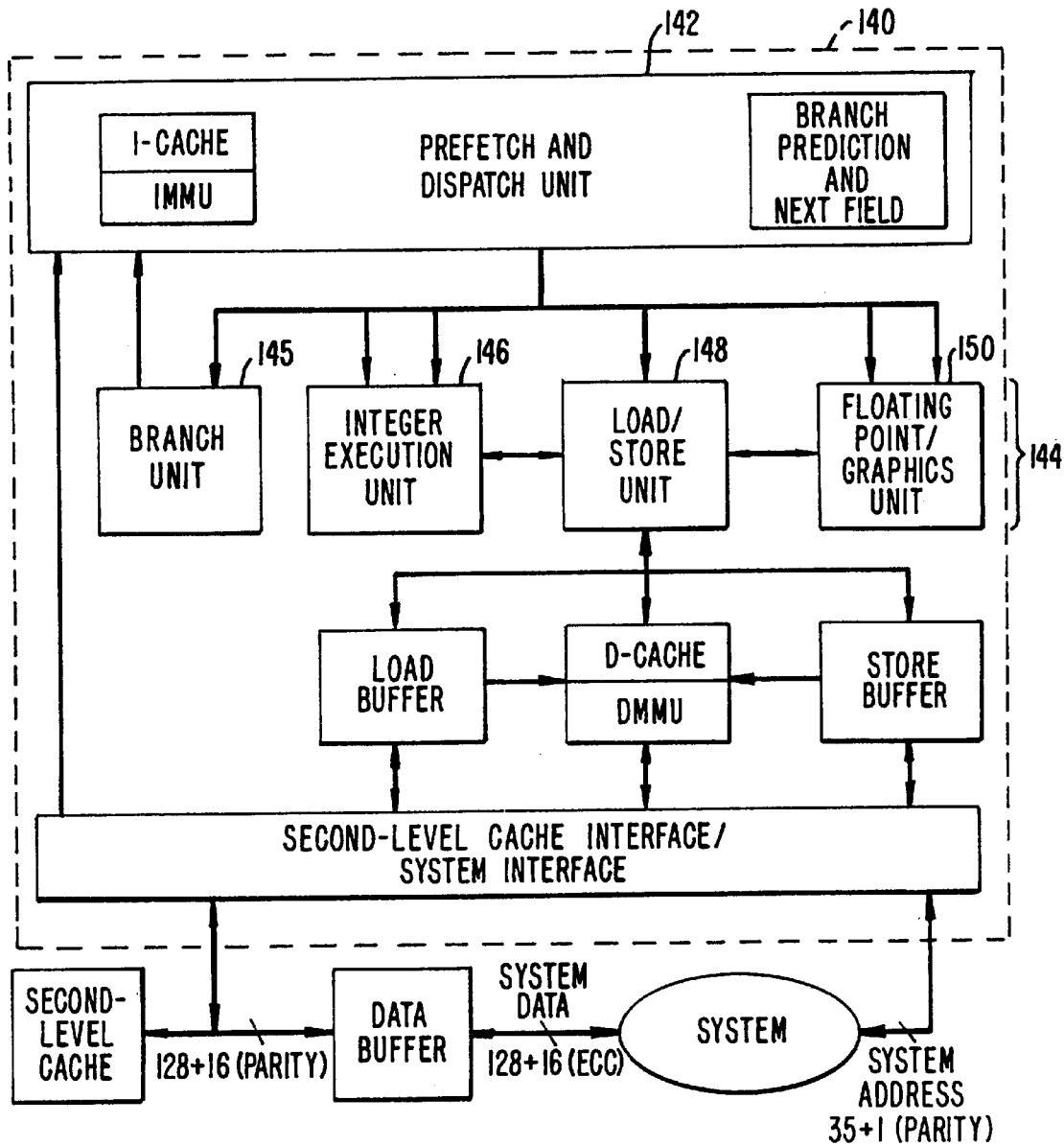
FIG. 3 is a block diagram of the major functional units in the UltraSPARC-I microprocessor.

FIG. 3 is a block diagram of the major functional units in the UltraSPARC-I microprocessor which is an exemplary processor that may be utilized to implement the present invention. A microprocessor 140 includes a front end Prefetch and Dispatch Unit (PDU) 142. The PDU prefetches instructions based upon a dynamic branch prediction mechanism and a next field address which allows single cycle branch following. Typically, branch prediction is better than 90% accurate which allows the PDU to supply four instructions per cycle to a core execution block 144.

The core execution block includes a Branch Unit 145, an Integer Execution Unit (IEU) 146, a Load/Store Unit (LSU) 148, and a Floating Point/Graphics Unit (FGU) 150. The units that make up the core execution block may operate in parallel (up to four instructions per cycle) which substantially enhances the throughput of the microprocessor. The IEU performs the integer arithmetic or logical operations. The LSU executes the instructions that transfer data between the memory hierarchy and register files in the IEU and FGU. The FGU performs floating point and graphics operations.

Figure 4:
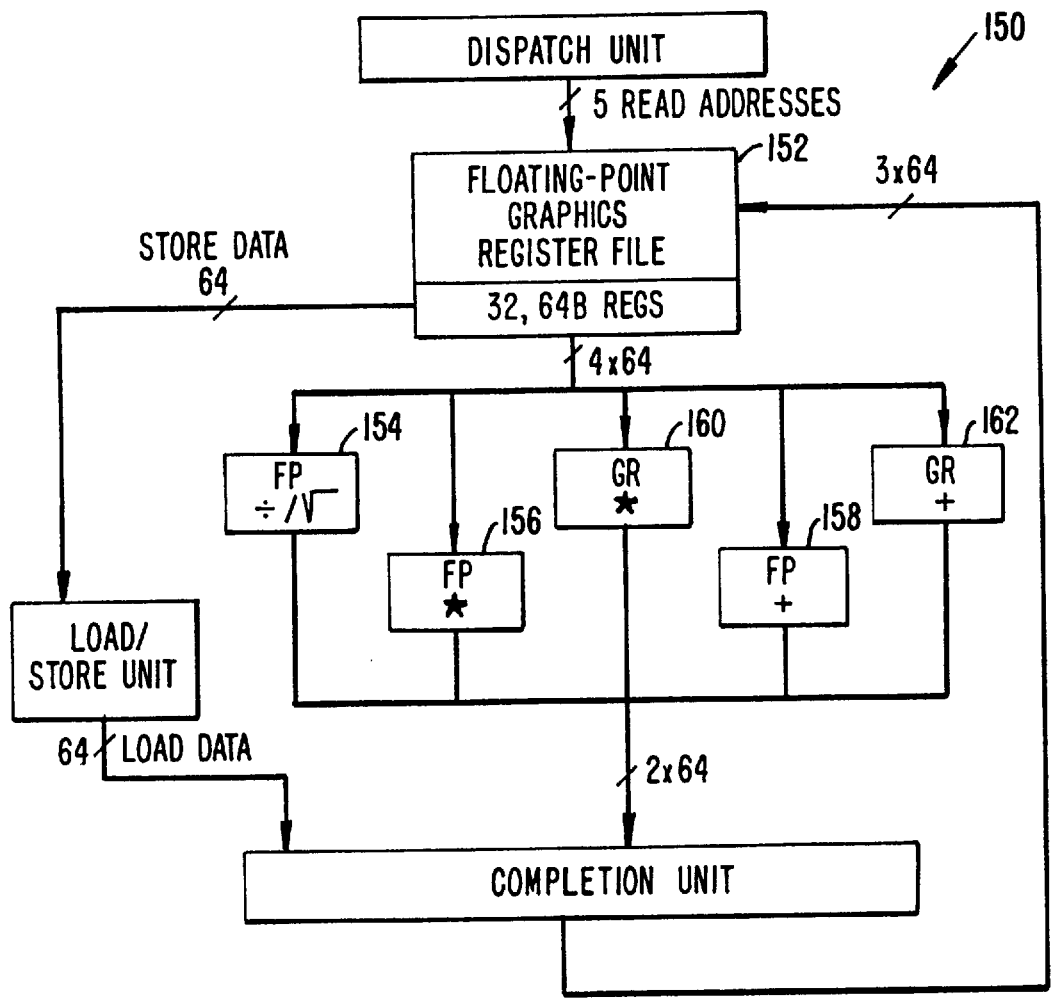
FIG. 4 shows a block diagram of the Floating Point/Graphics Unit.

FIG. 4 shows a block diagram of the Floating Point/Graphics Unit. FGU 150 includes a Register File 152 and five functional units which may operate in parallel. The Register File incorporates 32 64-bit registers. Three of the functional units are a floating point divider 154, a floating point multiplier 156, and a floating point adder 158. The floating point units perform all the floating point operations. The remaining two functional units are a graphics multiplier (GRM) 160 and a graphics adder (GRA) 162. The graphical units perform all the graphics operations of the Visual Instruction Set (VIS) instructions.

The VIS instructions are machine code extensions that allow for enhanced graphics capabilities. The VIS instructions typically operate on partitioned data formats. In a partitioned data format, 32 and 64-bit words include multiple word components. For example, a 32-bit word may be composed of four unsigned bytes and each byte may represent a pixel intensity value of an image. As another example, a 64-bit word may be composed of four signed 16-bit words and each 16-bit word may represent the result of a partitioned multiplication.

The VIS instructions allow the microprocessor to operate on multiple pixels or bands in parallel. The GRA performs single cycle partitioned add and subtract, data alignment, merge, expand and logical operations. The GRM performs three cycle partitioned multiplication, compare, pack and pixel distance operations. The following is a description of some these operations that may be utilized with the present invention.

Figure 5:
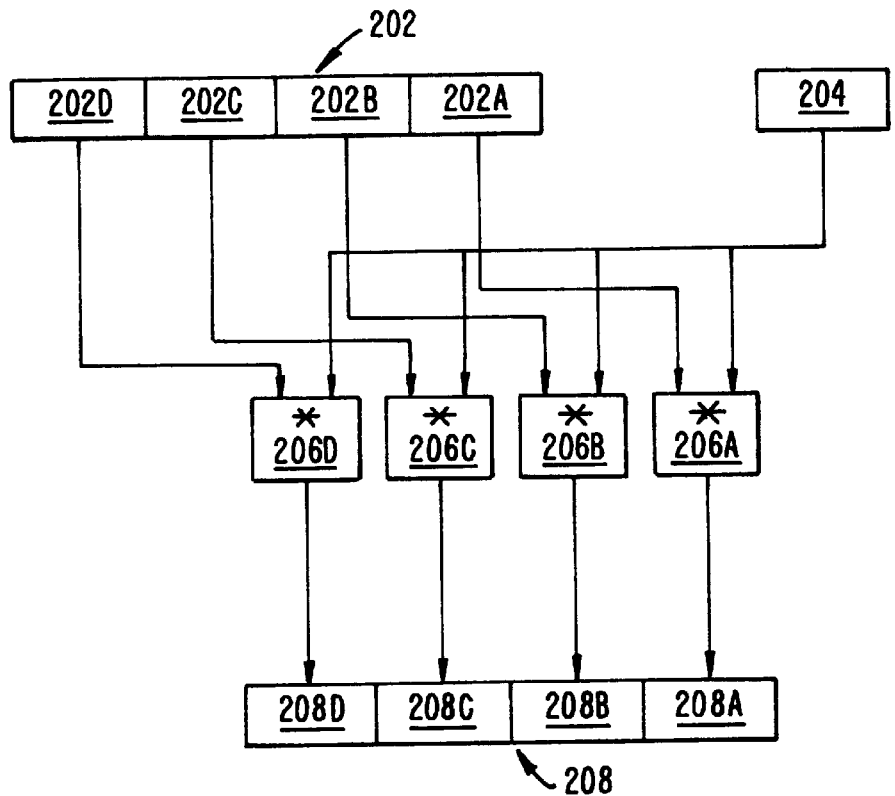
FIG. 5 is a flow diagram of a partitioned multiply instruction.

FIG. 5 is a flow diagram of a partitioned multiply instruction. A register 202 is partitioned into a number of word components 202A–D. Each word component is multiplied by a scale value in a register 204. Each of word components 202A–D is coupled to an input of a respective one of processing sub-units 206A–D. Processing sub-units 206A–D are included in a the FGU of the microprocessor. Register 204 is coupled to a respective input of each of processing sub-units 206A–D, which operate in a multiplication mode simultaneously and in parallel to multiply data stored in register 204 by data stored in word components 202A–D, respectively, of register 202 in a partitioned multiplication operation.

The results of the partitioned multiplication are stored in respective word components 206A–D of a register 208, which are coupled to outputs of processing sub-units 206A–D, respectively. As an example, register 202 may be a 32-bit word including four unsigned bytes with each byte corresponding to the intensity of a pixel. The scale value may be a 16-bit word that is multiplied by each of the unsigned bytes in register 202 to produce a 64-bit result in register 208. Register 208 would then include four 16-bit word components, each corresponding to a product of an unsigned byte multiplied by the scale value.

As a result, the partitioned multiplication instruction is capable of multiplying four pixel values by a scale value in one machine instruction if the number of bands for each pixel is one. If the number of bands for each pixel is two, two pixels may be manipulated in one machine instruction. If the number of bands for each pixel is four, one pixel may be manipulated in one machine instruction. Thus, the partitioned multiplication instruction produces a four-fold increase in pixel manipulation.

For example, assume that an image is a gray-scale image and the number of bands for each pixel is one. The intensity of each pixel ranges from 0–255 as it is stored in an unsigned byte. Accordingly, register 202 stores the pixel values for four pixels. In a single machine instruction, each of the pixels may be multiplied by a 16-bit scale value in register 204 to produce a 64-bit word in register 208. Thus, register 208 includes four 16-bit products.

Figure 6:
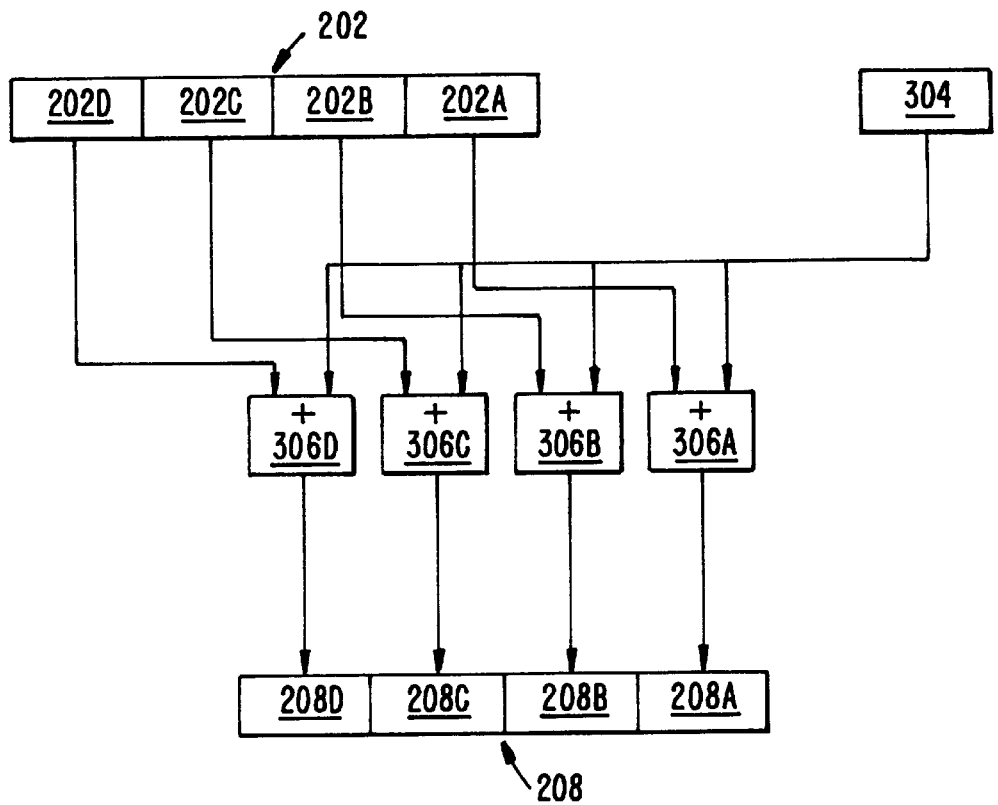
FIG. 6 is a flow diagram of a partitioned add instruction.

FIG. 6 is a flow diagram of a partitioned add instruction. A register 202 is partitioned into a number of word components 202A–D. An offset value in a register 304 is added to each word component. Each of word components 202A–D is coupled to an input of a respective one of processing sub-units 306A–D. Processing sub-units 306A–D are included in a the FGU of the microprocessor. Register 304 is coupled to a respective input of each of processing sub-units 306A–D, which operate in an addition mode simultaneously and in parallel to add data stored in register 304 to data stored in word components 202A–D, respectively, of register 202 in a partitioned addition operation.

The results of the partitioned addition are stored in respective word components 206A–D of a register 208, which are coupled to outputs of processing sub-units 306A–D, respectively. As an example, register 202 may be a 32-bit word including four unsigned bytes with each byte corresponding to the intensity of a pixel. The offset value may be a 16-bit word that is added to each of the unsigned bytes in register 202 to produce a 64-bit result in register 208. Register 208 would then include four 16-bit word components, each corresponding to a sum of an unsigned byte added to the scale value.

As a result, the partitioned addition instruction is capable of adding four pixel values to an offset value in one machine instruction if the number of bands for each pixel is one. If the number of bands for each pixel is two, two pixels may be manipulated in one machine instruction. If the number of bands for each pixel is four, one pixel may be manipulated in one machine instruction. Thus, the partitioned addition instruction produces a four-fold increase in pixel manipulation.

For example, assume that an image is a color image and the number of bands for each pixel is four. The bands for each pixel are R, G, B and $\alpha$. The value for each band ranges from 0–255 as it is stored in an unsigned byte. Accordingly, register 202 stores the band values for one pixel. In a single machine instruction, each of the bands may have a 16-bit offset value in register 204 added to produce a 64-bit word in register 208. Thus, register 208 includes four 16-bit sums.

Figure 7:
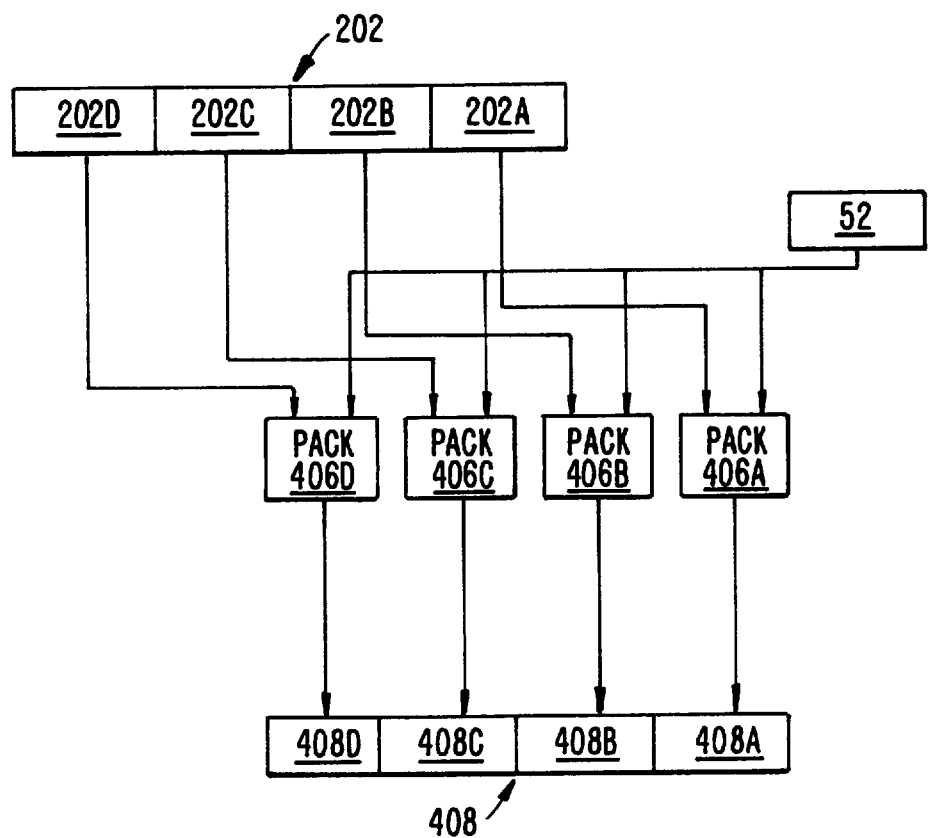
FIG. 7 is a flow diagram of a partitioned pack instruction.

FIG. 7 is a flow diagram of a partitioned pack instruction. A register 202 is partitioned into a number of word components 202A–D. The word components in register 202 are left shifted by the number of bits in a register 52. Each of word components 202A–D is coupled to an input of a respective one of processing sub-units 406A–D. Processing sub-units 406A–D are included in a the FGU of the microprocessor. Register 52 is coupled to a respective input of each of processing sub-units 406A–D, which operate in a shift mode simultaneously and in parallel to left shift each of word components 202A–D the number of times specified by register 52.

Sub-units 406A–D then place the bits 7–14 of the left shifted word components 202A–D in respective word components 406A–D of a register 408, which are coupled to outputs of processing sub-units 406A–D, respectively. As an example, register 202 may be a 32-bit word including four unsigned bytes with each byte corresponding to the intensity of a pixel. Assume that word component 202A is the following byte:

0010 1000

If register 52 specify that word components 202A–D are to be left shifted five times, word component 202A will be left shifted by sub-unit 406A to produce the following 16-bit word:

0000 0101 0000 0000

Sub-unit 406A then places bits 7–14 of the left shifted word (where the 0 bit is the right-most bit) in word component 408A. Thus, sub-unit 406A places or packs the following byte into word component 408A:

0000 1010

As shown, the pack operation allows the microprocessor to truncate lower bits off four word components in parallel.

Figure 8:
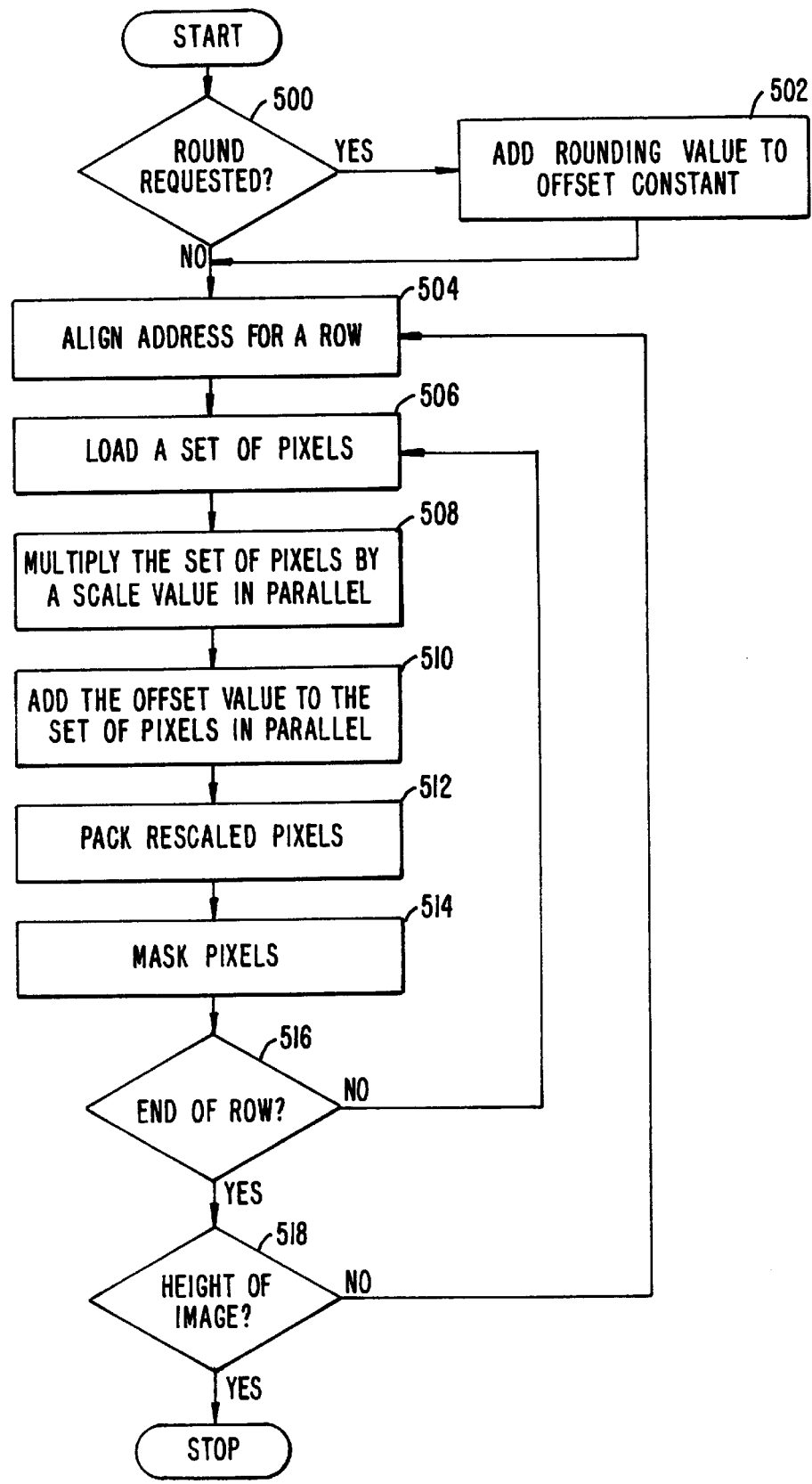
FIG. 8 shows a high level flowchart of a process of rescaling an image.

FIG. 8 shows a high level flowchart of a process of rescaling an image. For simplicity, the process of rescaling an image will be described as if each pixel is only represented by one band. However, if each pixel is represented by more than one band, the process is the same as shown in FIG. 8 and described below except that the system then rescales sets of bands in parallel, not pixels.

At step 500, the system determines if a round operation is requested. If a round operation is requested, a rounding value is added to the offset value at step 502. The offset value is B in the equation "A*pixel+B" discussed previously. As the pack operation truncates bits, it may be desirable to add the binary equivalent of 0.5 to the rescaled pixels before they are truncated. Although this addition step could be performed within the loops shown in FIG. 8, it is beneficial to move this addition step outside the loops to increase the efficiency of the process.

At step 504, the system aligns an address for a row in memory. Images are stored conceptually in rows and columns of pixels. The system first sets an address to access a row of an image in memory (or image buffer). Although the present invention is described as processing pixels in a column major order, the pixels may be processed in a row major order if stored appropriately.

The system loads a set of pixels from memory at step 506. The system may load up to four pixels into a partitioned register in one machine instruction. Thus, the pixels will be stored in word components of the partitioned register. The pixels are accessed utilizing the row address calculated in step 504.

At step 508, the system multiplies the set of pixels by a scale value in parallel. The scale value is A in the equation "A*pixel+B" discussed previously. The system utilizes the partitioned multiply instruction to multiply the scale value by each of the word components of the set of pixels. The partitioned multiply instruction allows up to four pixels to be manipulated in parallel.

The system then adds the offset value to the set of pixels at step 510. The offset value will include a rounding value if rounding was requested at step 500. The system utilizes the partitioned add instruction to add the offset value to each of the word components of the set of pixels. The partitioned add instruction allows up to four pixels to be manipulated in parallel. Although FIG. 8 shows the multiply step performed before the add step, these steps may also be performed in the reverse order.

At step 512, the system packs the rescaled pixels into an image buffer in one machine instruction. The image buffer may be a register or memory location. Thus, the system may pack the rescaled pixels back into the memory location from which they were loaded at step 506. The pack instruction effectively clips the rescaled pixels to an acceptable range.

At step 514, the system masks out the pixels specified by a binary mask. Although the masking step is optional, it provides the system with the capability to rescale only selected pixels specified by the user.

The system determines if it has reached the end of a row of the image at step 516. If not, the system proceeds to process the next set of pixels. In a preferred embodiment, the system processes two sets of four pixels at the same time. This is because a pixel may is represented by one byte so it takes two sets of four pixels to fill a 64-bit word.

At step 518, the system determines if it has reached the height of the image. If the system has not reached the height of the image, there is still another row to be processed so the system proceeds to step 504. Otherwise, the image has been rescaled and the process is complete.

Figure 9:
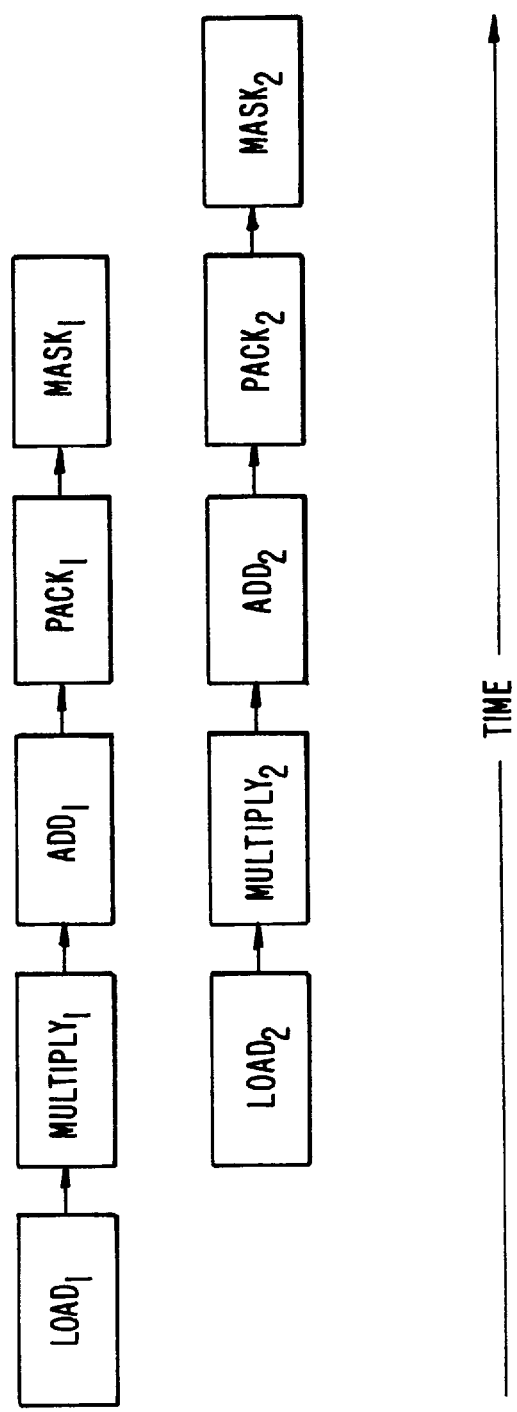
FIG. 9 illustrates a possible timing diagram of the microprocessor instructions produced by the flowchart of FIG. 8.

FIG. 9 illustrates a possible timing diagram of the microprocessor instructions produced by the flowchart of FIG. 8. In a preferred embodiment utilizing the UltraSPARC-I microprocessor which is a superscalar processor capable of processing multiple machine instructions each cycle. The top of FIG. 9 shows the main flow of FIG. 8 with respect to a first set of pixels (subscript 1). A second set of pixels may be processed concurrently with the first set as shown. For example, as partitioned Multiply$_1$ is performed by FGM and parallel Load$_2$ is performed by LSU, they may be executed at the same time. Similarly, as partitioned Add$_1$ is performed by FGA and partitioned Multiply$_2$ is performed by FGM, they may be executed at the same time. Thus, there are two levels of concurrency: at the machine instruction level pixels may be manipulated in parallel and machine instructions may process two sets of pixels at the same time.

While the above is a complete description of the preferred embodiments of the invention, various alternatives, modifications and equivalents may be used. It should be evident that the present invention is equally applicable by making appropriate modifications to the embodiments described above. Therefore, the above description should not be taken as limiting the scope of the invention which is defined by the metes and bounds of the appended claims.

What is claimed is:

1. In a computer system including a processor having the capability of operating on words no greater than words having n-bit values, the system also including an image buffer capable of storing such values, a method of rescaling an image containing pixels, wherein pixels in the image are individually defined by a word having such an n-bit value, the method comprising:

loading a first plurality of n-bit long word components associated with corresponding pixels in the image into the processor in one machine instruction;

rescaling the first plurality of word components in parallel; and packing the rescaled n-bit value word components into the image buffer in one machine instruction.

2. The method of claim 1, wherein the step of rescaling comprises the steps of:

multiplying the first plurality of word components by a scale value in parallel; and adding an offset value to the first plurality of word components in parallel.

3. The method of claim 1, wherein the step of packing comprises the step of truncating the rescaled first plurality of word components to have at least a minimum value and at most a maximum value.

4. The method of claim 1, further comprising the step of masking out a portion of the first plurality of word components.

5. The method of claim 1, further comprising the step of processing a second plurality of word components concurrently with the processing of the first plurality of word components.

6. In a computer system including a processor having the capability of operating on words no greater than words having n-bit values, the system also including an image buffer capable of storing such values, a method of generating computer readable code to rescale images, the method comprising:

generating computer readable code configured to load a first plurality of word components each having an n-bit value into the processor in one machine instruction, each word component associated with a corresponding n-bit value pixel of an image;

generating computer readable code configured to rescale the first plurality of word components in parallel; and generating computer readable code configured to pack the rescaled first plurality of n-bit word components into the image buffer in one machine instruction.

7. The method of claim 6, wherein the step of generating computer readable code configured to rescale comprises the steps of:

generating computer readable code configured to multiply the first plurality of word components by a scale value in parallel; and generating computer readable code configured to add an offset value to the first plurality of word components in parallel.

8. The method of claim 6, wherein the step of generating computer readable code configured to pack comprises the step of generating computer readable code configured to truncate the rescaled first plurality of word components to have at least a minimum value and at most a maximum value.

9. The method of claim 6, further comprising the step of generating computer readable code configured to mask out a portion of the first plurality of word components.

10. The method of claim 6, further comprising the step of generating computer readable code configured to process a second plurality of word components concurrently with the processing of the first plurality of word components.

11. A computer program product for use in a computer system having the capability of operating on words no greater than n-bit values comprising a computer usable medium having computer readable code embodied therein for rescaling images, the medium comprising:

computer readable code configured to load a first plurality of n-bit value word components into a processor in one machine instruction, each word component associated with a pixel of an image;

computer readable code configured to rescale the first plurality of n-bit length word components in parallel; and computer readable code configured to pack the rescaled first plurality of word components into an image buffer in one machine instruction.

12. The product of claim 11, wherein the computer readable code configured to rescale comprises:

computer readable code configured to multiply the first plurality of word components by a scale value in parallel; and computer readable code configured to add an offset value to the first plurality of word components in parallel.

13. The product of claim 11, wherein the computer readable code configured to pack comprises computer readable code configured to truncate the rescaled first plurality of word components to have at least a minimum value and at most a maximum value.

14. The product of claim 11, further comprising computer readable code configured to mask out a portion of the first plurality of word components.

15. The product of claim 11, further comprising computer readable code configured to process a second plurality of word components concurrently with the processing of the first plurality of word components.

16. A computer system comprising:

a processor having the capability of operating on words no greater than words having n-bit values; and a storage device coupled to the processor having computer readable code embodied therein for rescaling images, comprising:

computer readable code configured to load a first plurality of n-bit value word components into a processor in one machine instruction, each word component associated with a pixel of an image;

computer readable code configured to rescale the first plurality of word components in parallel; and computer readable code configured to pack the rescaled first plurality of n-bit word components into an image buffer in one machine instruction.

17. The system of claim 16, wherein the computer readable code configured to rescale comprises:

computer readable code configured to multiply the first plurality of word components by a scale value in parallel; and computer readable code configured to add an offset value to the first plurality of word components in parallel.

18. The system of claim 16, wherein the computer readable code configured to pack comprises computer readable code configured to truncate the rescaled first plurality of word components to have at least a minimum value and at most a maximum value.

19. The system of claim 16, further comprising computer readable code configured to mask out a portion of the first plurality of word components.

20. The system of claim 16, further comprising computer readable code configured to process a second plurality of word components concurrently with the processing of the first plurality of word components.

* * * * *